Sept. 4, 1951 R. E. DEEBLE 2,567,059
EXTENSIBLE FISHING NET
Filed Dec. 13, 1947 2 Sheets-Sheet 1
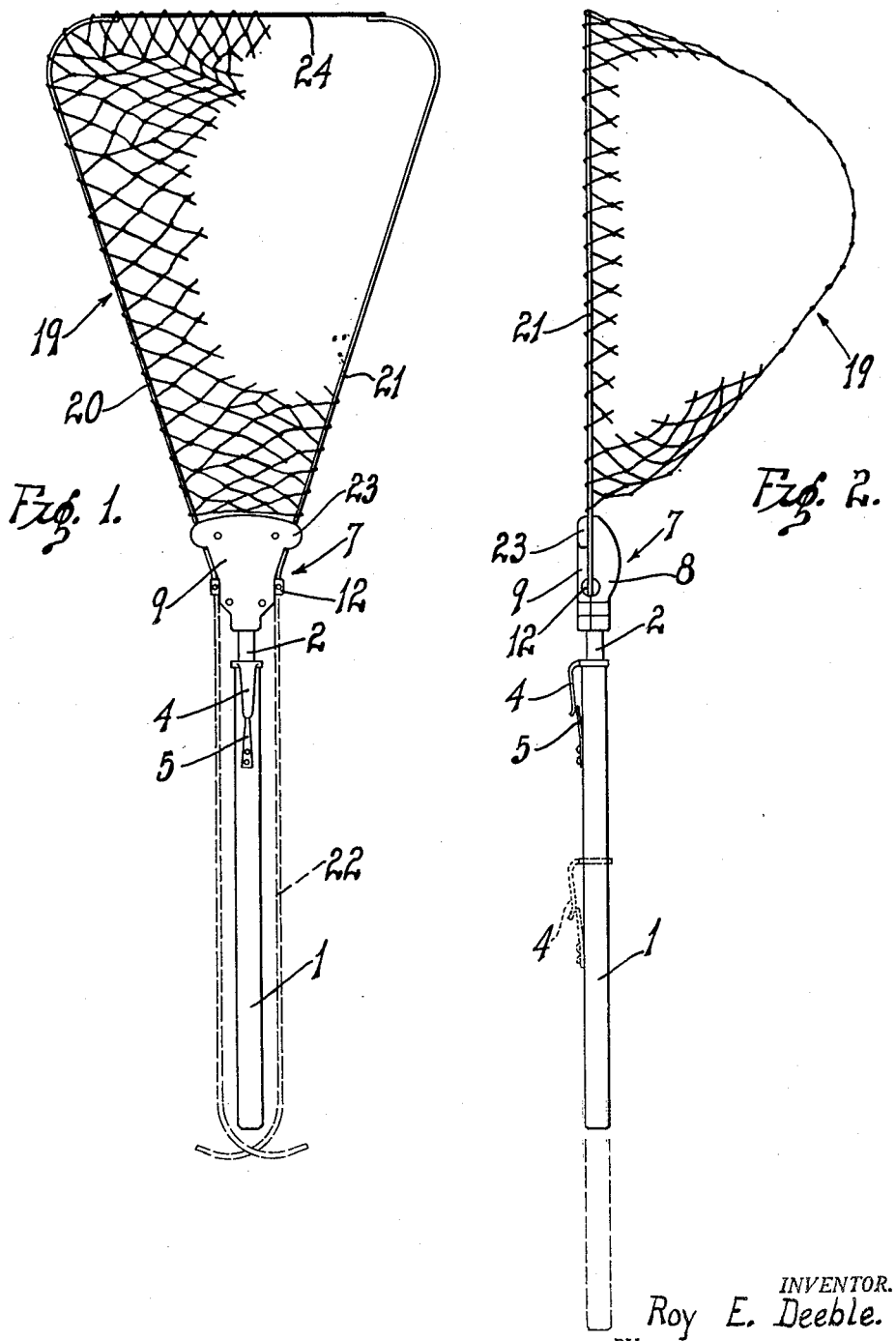
INVENTOR.
Roy E. Deeble.
BY
H. A. Dreckman
ATTORNEY.

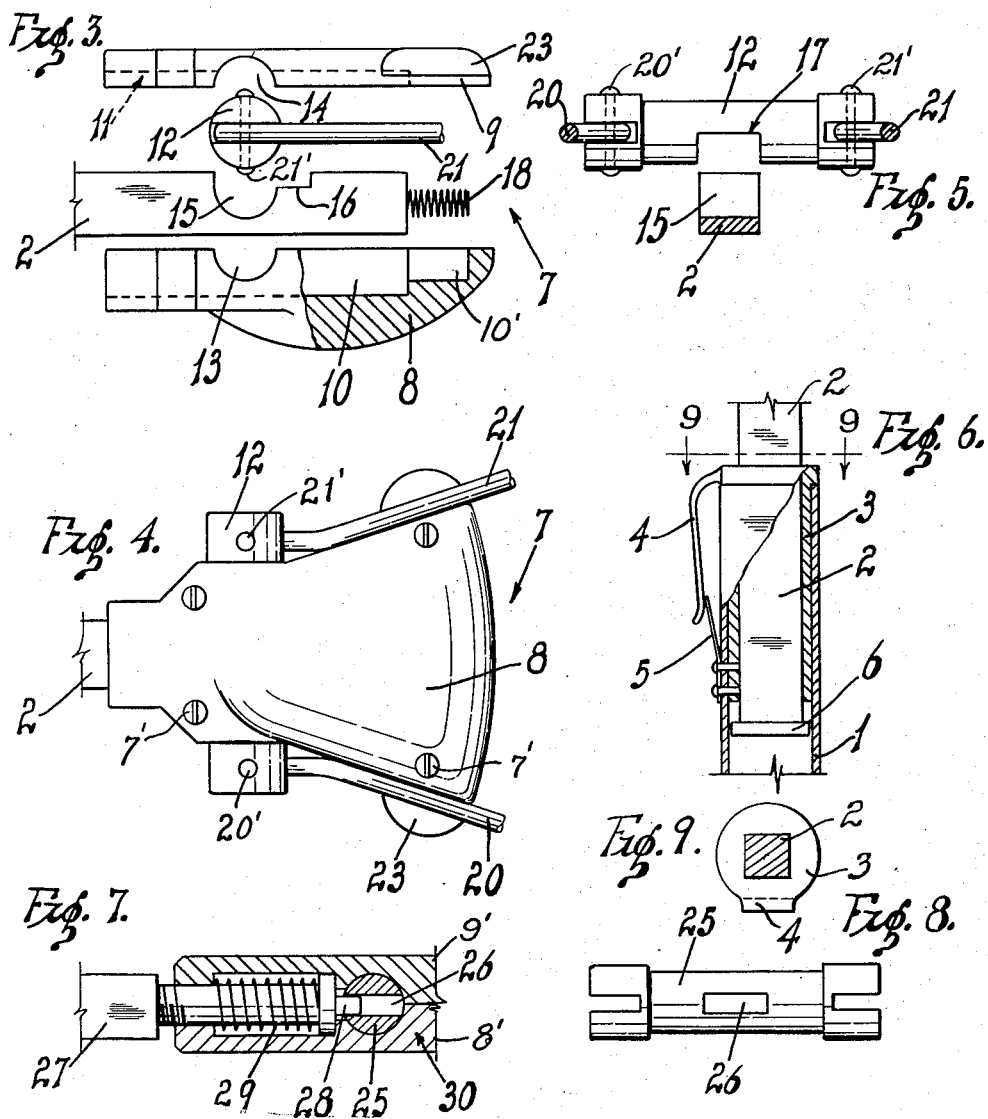

Patented Sept. 4, 1951

2,567,059

UNITED STATES PATENT OFFICE 2,567,059

EXTENSIBLE FISHING NET

Roy E. Deeble, Long Beach, Calif.

Application December 13, 1947, Serial No. 791,555

5 Claims. (Cl. 43—12)

This invention relates to an extensible fishing net in which the net portion folds onto the handle in folded position, and in which the net is locked in extended position for the purpose of retrieving a fish.

An object of my invention is to provide a novel extensible fishing net in which the net is locked in extended position and can be released to permit folding by releasing a latch which holds the net in extended position.

Another object of my invention is to provide a novel extensible fishing net in which the net can be either extended or folded with one hand, and this folding or extending operation can be simply and easily performed with one hand.

A feature of my invention resides in the novel extension handle which also can be extended or collapsed with one hand.

Still another object is to provide a novel extensible fishing net which is simple in construction and operation, and can be quickly and easily manipulated by the fisherman when it is desired to use the net.

Other objects, advantages and features of invention may appear from the accompanying drawing, the subjoined detailed description, and the appended claims.

In the drawing:

Figure 1 is a top plan view of my extensible fishing net.

Figure 2 is a side elevation of the same.

Figure 3 is an exploded side elevation of the head, one portion thereof shown partly in section.

Figure 4 is a bottom plan view of the head.

Figure 5 is a front elevation of the rotating shaft.

Figure 6 is a fragmentary side elevation of the handle with parts broken away to show interior construction.

Figure 7 is a fragmentary longitudinal sectional view of the head and control rod of another form of the invention.

Figure 8 is a side elevation of the rotating shaft as employed in the structure shown in Figure 7.

Fig. 9 is a sectional view taken on line 9—9 of Figure 6, the said view having been rotated counter-clockwise 90 degrees.

Referring more particularly to the drawing, the numeral 1 indicates a hollow handle, and the numeral 2 a control rod, which is slidably mounted in the handle 1. The control rod is square or flat sided and the purpose of this construction is to prevent its rotation in the handle 1 or in the remaining parts of the structure, which will be subsequently described. A sleeve 3 is fixedly mounted in the end of the handle 1 and serves to reinforce the end of this handle so that a hook 4 may be formed on the sleeve and a spring 5 may be attached to the handle and the sleeve 2, substantially as shown in Figure 6. Thus the entire assembly can be hooked to the belt or pocket of the fisherman. A shoulder 6 on the end of the control rod 2 strikes the sleeve 3, and thus limits the outward movement of the rod and permits extension of the handle to suit the needs of the fisherman. The sleeve 3 has a square hole through it to fit the square rod 2, as shown in Figure 9.

The control rod 2 extends into a head 7, and this head includes a bottom section 8 and a top section 9. These two head sections are detachably secured together by suitable means, such as machine screws or the like 7'. The control rod 2 extends into the head 7, and the section 8 of the head is formed with a square longitudinally extending groove 10 formed to fit the rod 2. A complementary groove 11 is formed in the top section 9, and when the head is assembled, the rod 2 can slide longitudinally within the head. A shaft 12 is juornaled in the head 7, the sections 8 and 9 having transverse semi-cylindrical grooves 13 and 14 respectively to receive the shaft 12. The control rod 2 is also formed with a semi-cylindrical transverse groove 15, and also a flat step 16, the step extending into the groove 15, substantially as shown in Figure 3. The shaft 12 is formed with a square recess 17 through which the rod 2 can pass. A spring 18 disposed in a reduced portion 10' of the groove 10 bears against the outer end of the control rod 2, and urges the rod and the head 7 apart, that is, the head 7 will tend to move away from the end of the rod 2, thus moving the step 16 into the recess 17, and thereby holding the shaft 12 against rotation. Notice that this action can only occur in one position of the shaft 12, namely when the net is extended, as will be further described. When the spring 18 is collapsed, the shaft 12 can freely rotate in the groove 15, and the net can be folded, and again this will be subsequently described.

The net 19 includes the frame arms 20, 21. These frame arms are fixedly attached one on each end of the shaft 12 by means of rivets 20', 21'. The arms are preferably formed of a spring metal and when folded will assume the position shown at 22 in Figure 1. When extended, the arms will engage shoulders or lugs 23 on the head 7, thus holding the frame arms in alignment with the handle 1. A thong 24 closes the outer end of the net 19, and this thong is attached to the ends of the arms 20, 21. Assuming first that the net 19 is folded against the handle 1, as shown in dotted lines in Figure 1, the shaft 12 can now rotate, and the operator merely permits the net 19 to swing until the arms 20, 21 engage the shoulders 23. In this position, the notch 17 of the shaft 12 permits longitudinal movement of the control rod 2. The spring 18 then pushes the step 16 under the shaft 12, and the net 19 is now held in extended position and latched so that it cannot collapse. To release the net 19 and collapse or fold the same, a rapid forward push on the handle 1 will cause the inertia of the head 7 to compress the spring 18. With the spring 18 compressed the semi-cylindrical grooves 13, 14 and 15 are all aligned and, therefore, the shaft 12 can rotate in these grooves, permitting the net 19 to be folded. When the control rod 2 moves forwardly in the head 7 compressing the spring 18, then the step 16 will move from under the shaft 12 and the shaft can rotate, as stated above.

In Figures 7 and 8, I have shown a slightly modified latching means for the shaft 25, this shaft being comparable to the shaft 12, and operates in substantially the same manner. The shaft 25 is provided with a transverse slot 26, and the control rod 27 is formed with a pin 28, which enters the slot 26. A spring 29 engages the control rod 27 and urges the pin 28 into the slot 26. The head 30 is substantially identical to the head 7 previously described. The operation of latching and unlatching the shaft 25 is similar to the method previously described to control the shaft 12. The head 30 comprises a lower portion 8' and an upper portion 9'.

Having described my invention, I claim:

1. A folding fishing net with an extensible handle, said handle comprising a hollow outer end, a rod telescopically mounted therein, a head on one end of said rod, said head comprising superposed sections, stop lugs adjacent the forward end of the upper section, both of said sections having oppositely positioned facing grooves, a shaft pivoted in said grooves, a net frame including laterally spaced arms, said arms being adapted to rest on said stop lugs, the free ends of said arms being secured to the shaft, and a net secured to said arms in advance of the head.

2. A folding fishing net with an extensible handle, said handle comprising a hollow outer end, a rod telescopically mounted therein, a head on one end of said rod, said head comprising superposed sections, stop lugs adjacent the forward end of the upper section, both of said sections having oppositely positioned facing grooves, a shaft pivoted in said grooves, a net frame including laterally spaced arms, said arms being adapted to rest on said stop lugs, the free ends of said arms being secured to the shaft, and a net secured to said arms in advance of the head, the upper section of the head having a downwardly facing longitudinal groove, the lower section having an upwardly facing longitudinal groove, provided with a reduced groove at its forward end, said longitudinal grooves being adapted to receive latch means constituted by a part of said rod, said shaft having a groove therein in which the latch is slidably mounted, and a spring in the reduced groove between a part of the latch and a portion of the lower section.

3. A folding fishing net with an extensible handle, said handle comprising a hollow outer end, a rod telescopically mounted therein, a head on one end of said rod, said head comprising superposed sections, stop lugs adjacent the forward end of the upper section, both of said sections having oppositely positioned facing grooves, a shaft pivoted in said grooves, a net frame including laterally spaced arms, said arms being adapted to rest on said stop lugs, the free ends of said arms being secured to the shaft, and a net secured to said arms in advance of the head, the upper section of the head having a downwardly facing longitudinal groove, the lower section having an upwardly facing longitudinal groove, provided with a reduced groove at its forward end, said longitudinal grooves being adapted to receive latch means constituted by a part of said rod, said shaft having a groove therein in which the latch is slidably mounted, and spring means engaging the end of said latch means, said spring urging the latch means into engagement with said shaft.

4. A folding fishing net with an extensible handle, said handle comprising a hollow outer end, a rod telescopically mounted therein, a head on one end of said rod, said head comprising superposed sections, stop lugs adjacent the forward end of the upper section, both of said sections having oppositely positioned facing grooves, a shaft pivoted in said grooves, a net frame including laterally spaced arms, said arms being adapted to rest on said stop lugs, the free ends of said arms being secured to the shaft, and a net secured to said arms in advance of the head, the upper section of the head having a downwardly facing longitudinal groove, the lower section having an upwardly facing longitudinal groove, said longitudinal grooves being adapted to receive latch means constituted by a part of said rod, said shaft having a groove in which the latch is slidably mounted, said latch means having a transverse arcuate groove therein, fitting said shaft in one position of the latch means and permitting rotation of said shaft.

5. A folding fishing net with an extensible handle, said handle comprising a hollow outer end, a rod telescopically mounted therein, a head on one end of said rod, said head comprising superposed sections, stop lugs adjacent the forward end of the upper section, both of said sections having oppositely positioned facing grooves, a shaft pivoted in said grooves, a net frame including laterally spaced arms, said arms being adapted to rest on said stop lugs, the free ends of said arms being secured to the shaft, and a net secured to said arms in advance of the head, the upper section of the head having a downwardly facing longitudinal groove, the lower section having an upwardly facing longitudinal groove, said longitudinal grooves being adapted to receive latch means constituted by a part of said rod, said shaft having a groove in which the latch is slidably mounted, said latch means having a transverse arcuate groove therein, fitting said shaft in one position of the latch means and permitting rotation of said shaft, and a flat step in the latch means extending from said transverse arcuate groove in the latch means, said step engaging the groove in the shaft in one position of the latch means to prevent rotation of said shaft, and spring means engaging the end of the latch means to urge said latch means into a position where said step engages the shaft.

ROY E. DEEBLE.

REFERENCES CITED

The following references are of record in the file of this patent:

UNITED STATES PATENTS

| Number | Name | Date |
|---|---|---|
| 234,090 | Thomas | Nov. 2, 1880 |
| 737,428 | Lindsey et al. | Aug. 25, 1903 |
| 1,214,423 | Casper | Jan. 30, 1914 |
| 1,306,553 | Morrison | June 10, 1919 |

FOREIGN PATENTS

| Number | Country | Date |
|---|---|---|
| 476,555 | Germany | May 18, 1929 |
| 737,106 | France | Dec. 7, 1932 |
| 846,284 | France | Sept. 13, 1939 |